A. KINGSBURY.
THRUST BEARING.
APPLICATION FILED NOV. 18, 1913.
1,117,506.
Patented Nov. 17, 1914.
2 SHEETS—SHEET 1.
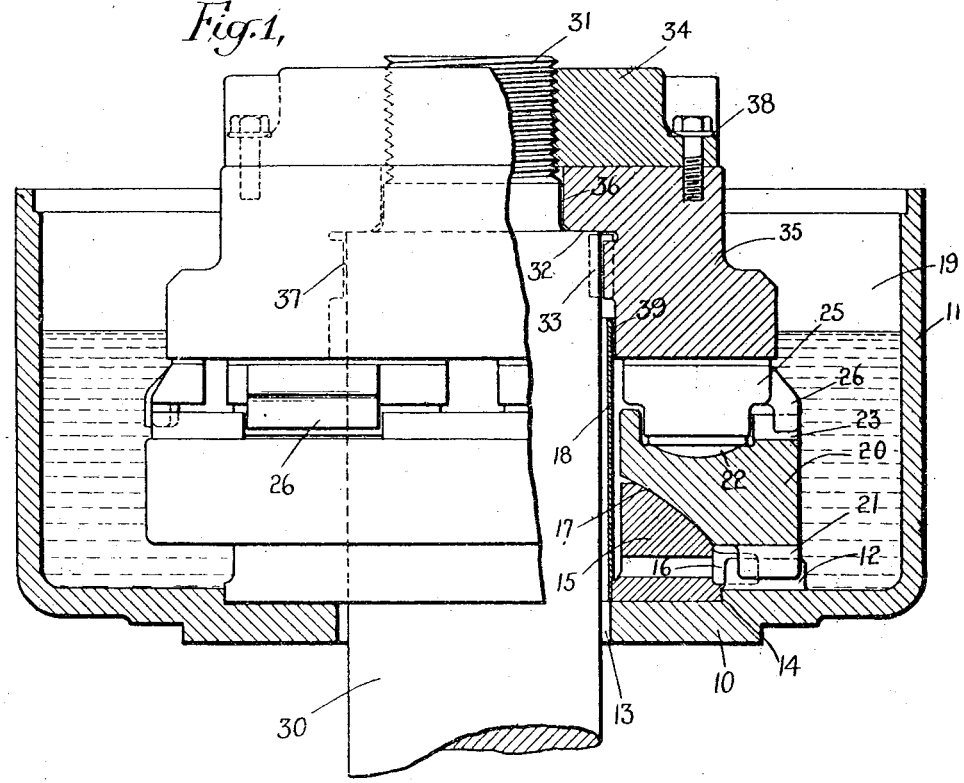
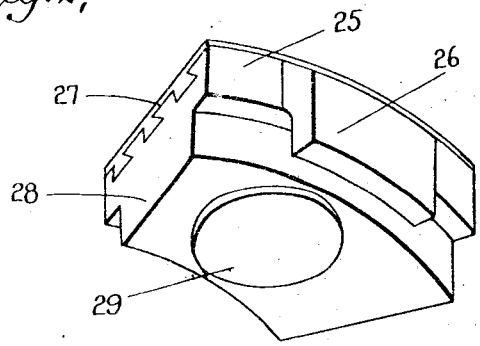
WITNESSES
E. W. Marshall
J. Graves
INVENTOR
Albert Kingsbury
BY
Earbory
ATTORNEY

A. KINGSBURY.
THRUST BEARING.
APPLICATION FILED NOV. 18, 1913.

1,117,506.

Patented Nov. 17, 1914.
2 SHEETS—SHEET 2.

WITNESSES
E. W. Marshall
F. Graves.

INVENTOR
Albert Kingsbury
BY R. H. Dearborn
ATTORNEY

UNITED STATES PATENT OFFICE.

ALBERT KINGSBURY, OF PITTSBURGH, PENNSYLVANIA.

THRUST-BEARING.

1,117,506. Specification of Letters Patent. Patented Nov. 17, 1914.

Application filed November 18, 1913. Serial No. 801,581.

*To all whom it may concern:*

Be it known that I, ALBERT KINGSBURY, a citizen of the United States, and a resident of Pittsburgh, county of Allegheny, and State of Pennsylvania, have invented certain new and useful Improvements in Thrust-Bearings, of which the following is a specification, reference being had to the accompanying drawings, forming a part thereof.

My invention relates to thrust bearings and it has special reference to such as are comprised of a plurality of tiltably supported radial bearing shoes.

One object of my invention is to provide a bearing of the character above indicated that shall be particularly adapted to operate continuously under very heavy thrust pressures and which at the same time shall be relatively inexpensive to manufacture and easy to assemble. In other words, it is my intention to provide a bearing that shall possess a number of advantages which have hitherto been attainable only by resorting to more difficult and expensive mechanical structures.

Other objects of my invention will be set forth hereinafter, and in order that my invention may be thoroughly understood, I will proceed to describe the same in the following specification and then point out the novel features thereof in appended claims.

Figure 3:
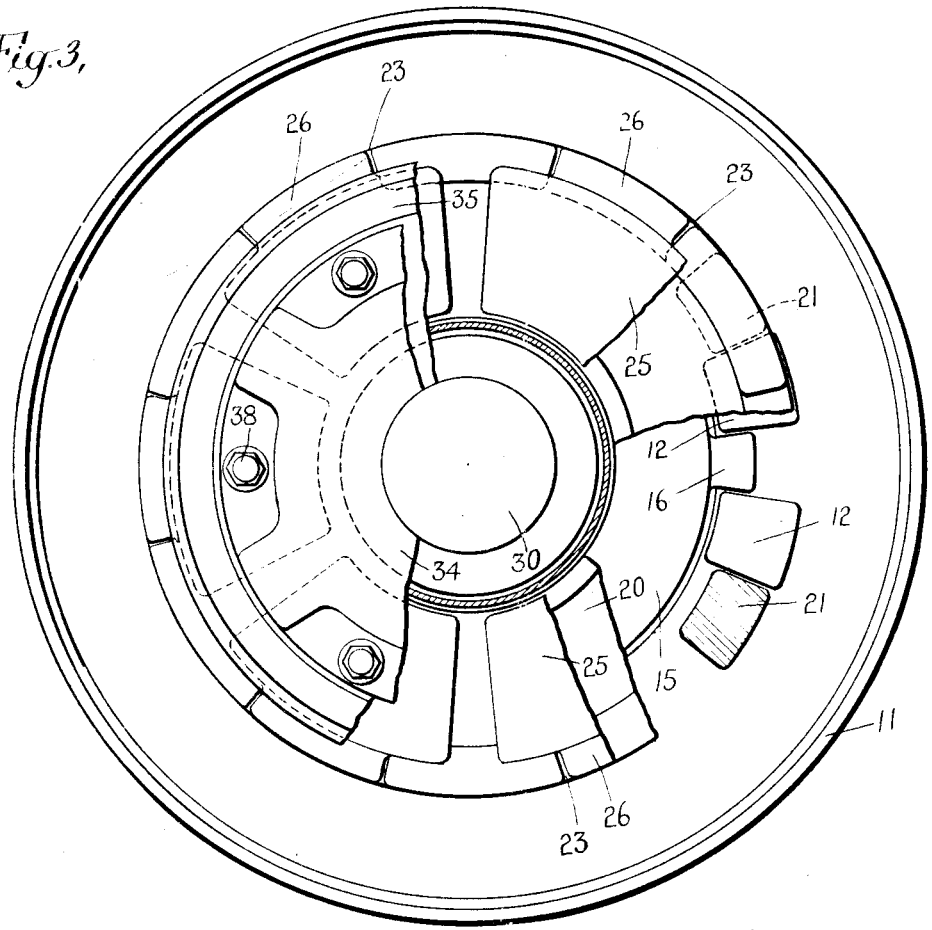
Figure 5:
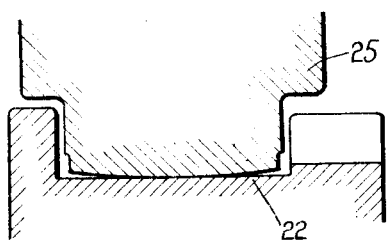
Figure 4:
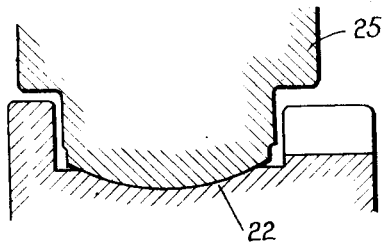

Referring to the drawings: Figure 1 is a partially sectional elevation of a bearing arranged and constructed in accordance with my invention. A perspective view of one of the bearing shoes which forms a part of the structure of Fig. 1 is shown in Fig. 2. A plan view of the same bearing is shown in Fig. 3 with various parts broken away in succession to disclose the bearing shoes and their supports. A sectional detail of one of the bearing shoes and its supporting ring is shown on a larger scale in Fig. 4. Fig. 5 is a view corresponding to Fig. 4, of a modified arrangement which also embodies my invention.

In Patent No. 947,242 granted January 25, 1910, on an application filed by me May 20, 1907, I have shown and described a thrust bearing which comprises a plurality of tiltably supported radial shoes and operates successfully at relatively high speeds and under very high pressures. My present invention relates to bearings of the same general character and is covered broadly by the claims of the aforesaid patent.

Referring to Figs. 1 to 4 inclusive of the drawings, the structure here shown comprises a relatively stationary support 10, a leveling washer 15, a base ring 20, a plurality of bearing shoes 25, a shaft 30, and a thrust collar 35.

The support 10 is provided with an annular flange 11 and is arranged to constitute an oil receptacle. The support is provided with a pair of upwardly extending spaced lugs 12 between which extends a laterally projecting lug 16 of the leveling washer 15. The support 10 has a central hole 13 through which the shaft 30 extends and its inside bottom surface is counterbored at 14 to provide an annular seat for the leveling washer 15.

The base ring 20 is mounted on the leveling washer and has a pair of downwardly extending lugs 21 which are adjacent to the lugs 12 of the support, the lugs 12 being located between the lugs 21.

The washer 15 has a spherically curved annular surface 17 which engages a correspondingly curved concave surface of the base ring, the arrangement being such that the ring is pivotally mounted on the washer. The dimensions of the lugs 12, 16 and 21 are such as not to interfere with a limited tilting movement of the base ring on its support, while at the same time they do prevent a rotative movement of either of these members relative to the support 10.

Secured to the washer 15 at its inner edge is a sleeve or flange 18 which completes an annular oil receptacle 19 in which the bearing members are disposed.

The top surface of the base ring 20 is provided with an annular groove 22, the bottom surface of which is circularly curved in transverse section, the outer flange of the groove being provided with a plurality of notches 23 to receive hook-shaped projections 26 of the respective bearing shoes 25.

As clearly shown in Fig. 2, each of the shoes is preferably provided at its bearing surface with a facing 27 of Babbitt or other suitable bearing material and has the general form of a ring sector. Each shoe is undercut to provide a segmental annular projection 28 which extends into the groove 22 of the base ring. A spherically curved extension 29 is provided on the bottom surface of the projection 28, the radius of curvature of the extension corresponding to the radius of curvature of the bottom of the groove 22, and the arrangement being such that when the shoe is mounted on the base ring the extension is seated in the bottom of the groove. I prefer to utilize curved surfaces of large radius.

The shaft 30 is provided with a screw-threaded extension 31 which is materially smaller in diameter than the body of the shaft and forms an annular shoulder 32. The thrust collar 35 has a central opening 36 and is counterbored at 37 to fit loosely onto the upper end of the body of the shaft and the base of the extension. A key 33 prevents the thrust collar from turning on the shaft and a nut 34 is screwed onto the shaft extension 31 and firmly clamps the thrust collar in position. When the nut is firmly set bolts 38 may be screwed through the nut into the thrust collar to prevent its loosening. The thrust collar is counterbored at 39 so that its lower end overhangs the flange 18. By this means the oil level in the receptacle 19 may be maintained above the bearing surfaces.

In operation the shoes 25 automatically assume slightly tilted positions and it is desirable that they may do so freely when subjected to very high thrust pressures. In order that this result may be attained without danger of crushing or distorting the shoe under full load conditions, the mounting of each shoe is particularly important.

I have previously proposed to utilize a structure in which each shoe has a spherically curved projection arranged to be seated in an independent spherically curved recess. An arrangement of this kind has many advantages which need not be mentioned here but has the disadvantage of offering considerable frictional opposition to tilting movements of the shoe. It has the further disadvantage of requiring the bearing surfaces of the shoes to be machined after they are mounted in position because it is extremely difficult to produce a plurality of spherically curved recesses having exactly the same depth.

As a modification of my present invention I have shown (see Fig. 5) an annular groove having a plane bottom surface which may be readily machined and on which the spherical shoe projections are seated. This arrangement allows the shoe to tilt freely but since there is theoretically a single point contact for each shoe it is advisable to harden the spherical projection.

The expense of hardening is avoided by the arrangement of Figs. 1 to 4 inclusive and at the same time the shoes tilt very readily since there is theoretically provided a line contact which is found in practice to be sufficient to sustain heavy loads.

The groove 22 whether it has a plane or a curved bottom may be machined at a relatively small expense and it is only necessary to make the shoes identical in order to have the bearing surfaces lie in a single plane when they are mounted in position. The fact that the base ring 20 is pivotally supported on the leveling washer equalizes the pressure among the several shoes so that they wear alike.

The heating of the bearing in operation is likely to dish the thrust collar somewhat and change its normally plane bearing surface to a frusto-conical surface of very low altitude. The mounting of the shoes 25 is such as to freely permit them to tilt and maintain a good bearing contact with the collar.

While I consider the structures illustrated to be particularly desirable, it will of course be understood that variations in size and arrangement of parts may be effected within the spirit and scope of my invention, and I intend that only such limitations be imposed as are indicated in the appended claims.

What I claim is:

1. A bearing comprising a plurality of bearing shoes each having a supporting projection with a spherically curved bottom surface, a base having an annular groove into which the shoe projections extend, in which the spherically curved supporting surfaces are seated, and into which the projections coöperate to limit the radial movement of the shoes, and coöperating means for limiting the revolutionary movement of each shoe relative to the base.

2. A bearing comprising a plurality of bearing shoes, each having a spherically curved bottom surface, and a base having an annular groove of circularly curved section in which the shoes are seated.

3. A bearing comprising a plurality of bearing shoes, each having a spherically curved bottom surface, and a base having an annular groove of circularly curved section in which the shoes are seated, the coöperating curved surfaces being of equal radius.

4. A bearing comprising a base ring having an annular groove in its top surface and a plurality of bearing shoes having downwardly extending projections with spherically curved bottom surfaces seated in the annular groove, and overhanging lugs extending into notches in the base ring.

5. A bearing comprising a base ring having an annular groove in its top surface of circularly curved section and a plurality of bearing shoes having downwardly extending projections with spherically curved bottom surfaces seated in the annular groove, and overhanging lugs extending into notches in the base ring.

6. A bearing comprising a support, a leveling washer seated thereon and having a spherically curved surface, a base ring tiltably supported on the washer and having an annular groove, and a plurality of bearing shoes tiltably seated in the annular groove and having overhanging lugs extending downwardly into notches in the base ring.

7. A bearing comprising a support, a leveling washer seated thereon and having a spherically curved surface, a base ring tiltably supported on the washer and having an annular groove, and a plurality of bearing shoes tiltably seated in the annular groove and having overhanging lugs extending downwardly into notches in the base ring; and a relatively rotatable member comprising a shaft extending centrally through the support and a thrust collar having a plane surface coöperating with the bearing shoes.

8. A bearing comprising a support, a leveling washer seated thereon and having a spherically curved surface, a base ring tiltably supported on the washer and having an annular groove overhanging lugs extending downwardly coöperate with the support, and a plurality of bearing shoes tiltably seated in the annular groove and having overhanging lugs extending downwardly into notches in the base ring; and a relatively rotatable member comprising a shaft extending centrally through the support and a thrust collar having a plane surface coöperating with the bearing shoes.

9. A bearing comprising a support, a leveling washer seated thereon and having a spherically curved surface, a base ring tiltably supported on the washer and having an annular groove in its top surface of circularly curved section, overhanging lugs extending downwardly with the aforesaid lugs between them, a plurality of bearing shoes tiltably seated in the annular groove and having overhanging lugs extending downwardly into notches in the base ring; and a relatively rotatable member comprising a shaft extending centrally through the support and a thrust collar having a plane surface coöperating with the bearing shoes.

10. A bearing comprising a support, a leveling washer seated thereon and having a spherically curved surface, a base ring having a concave spherically curved bottom surface seated on the curved surface of the washer and having an annular groove in its top surface of circularly curved section, overhanging lugs extending downwardly with the aforesaid lugs between them, a plurality of bearing shoes tiltably seated in the annular groove and having overhanging lugs extending downwardly into notches in the base ring; and a relatively rotatable member comprising a shaft extending centrally through the support and a thrust collar having a plane surface coöperating with the bearing shoes.

11. A bearing comprising a support, a leveling washer seated thereon and having a spherically curved upper surface and a lug extending laterally between the lugs of the support, a base ring having a concave spherically curved bottom surface seated on the curved surface of the washer and having an annular groove in its top surface of circularly curved section, overhanging lugs extending downwardly with the aforesaid lugs between them, a plurality of bearing shoes tiltably seated in the annular groove and having overhanging lugs extending downwardly into notches in the base ring, and a relatively rotatable member comprising a shaft extending centrally through the support and a thrust collar having a plane surface coöperating with the bearing shoes.

12. A bearing comprising a support constituting an annular oil receptacle and having an annular depression and a pair of spaced lugs adjacent to the depression, a leveling washer seated in said annular depression and having a spherically curved upper surface and a lug extending laterally between the lugs of the support, a base ring having a concave spherically curved bottom surface seated on the curved surface of the washer and having an annular groove in its top surface of circularly curved section, overhanging lugs extending downwardly with the aforesaid lugs between them, a plurality of bearing shoes tiltably seated in the annular groove and having overhanging lugs extending downwardly into notches in the base ring; and a relatively rotatable member comprising a shaft extending centrally through the support and a thrust collar having a plane surface coöperating with the bearing shoes.

In testimony whereof, I have hereunto set my hand in the presence of two subscribing witnesses, this 14th day of November, 1913.

ALBERT KINGSBURY.

Witnesses:
M. C. MERZ,
B. B. HINES

It is hereby certified that in Letters Patent No. 1,117,506, granted November 17, 1914, upon the application of Albert Kingsbury, of Pittsburgh, Pennsylvania, for an improvement in "Thrust-Bearings," an error appears in the printed specification requiring correction as follows: Page 2, line 98, for the word "into" read *with;* and that the said Letters Patent should be read with this correction therein that the same may conform to the record of the case in the Patent Office.

Signed and sealed this 8th day of December, A. D., 1914.

[SEAL.]

J. T. NEWTON,
*Acting Commissioner of Patents.*